Feb. 18, 1958   F. R. SWANSON ET AL   2,823,590
MACHINE TOOL
Filed March 14, 1956   3 Sheets-Sheet 1
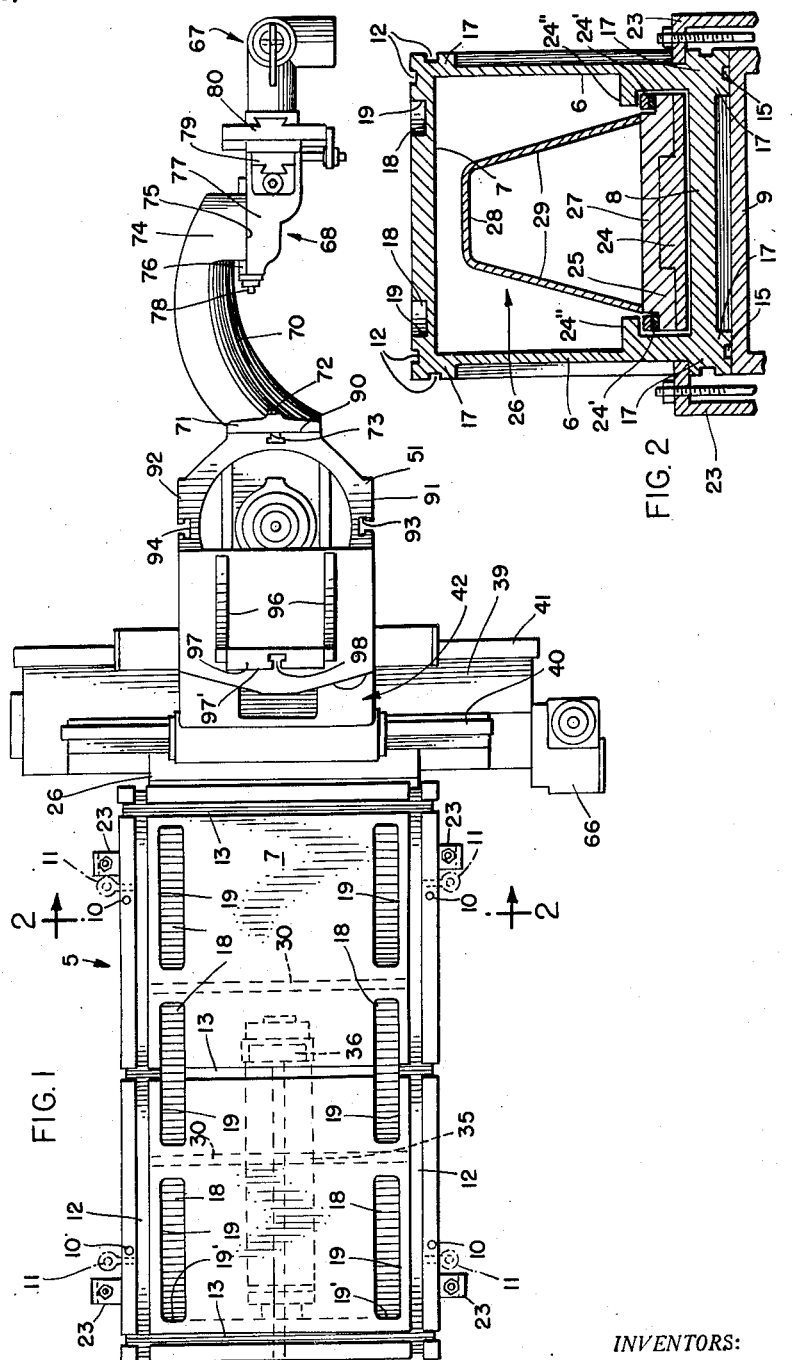
INVENTORS:
FRED R. SWANSON
CARL F. ERIKSON
BY Schroeder, Hofgren,
Brady & Wegner
ATT'YS

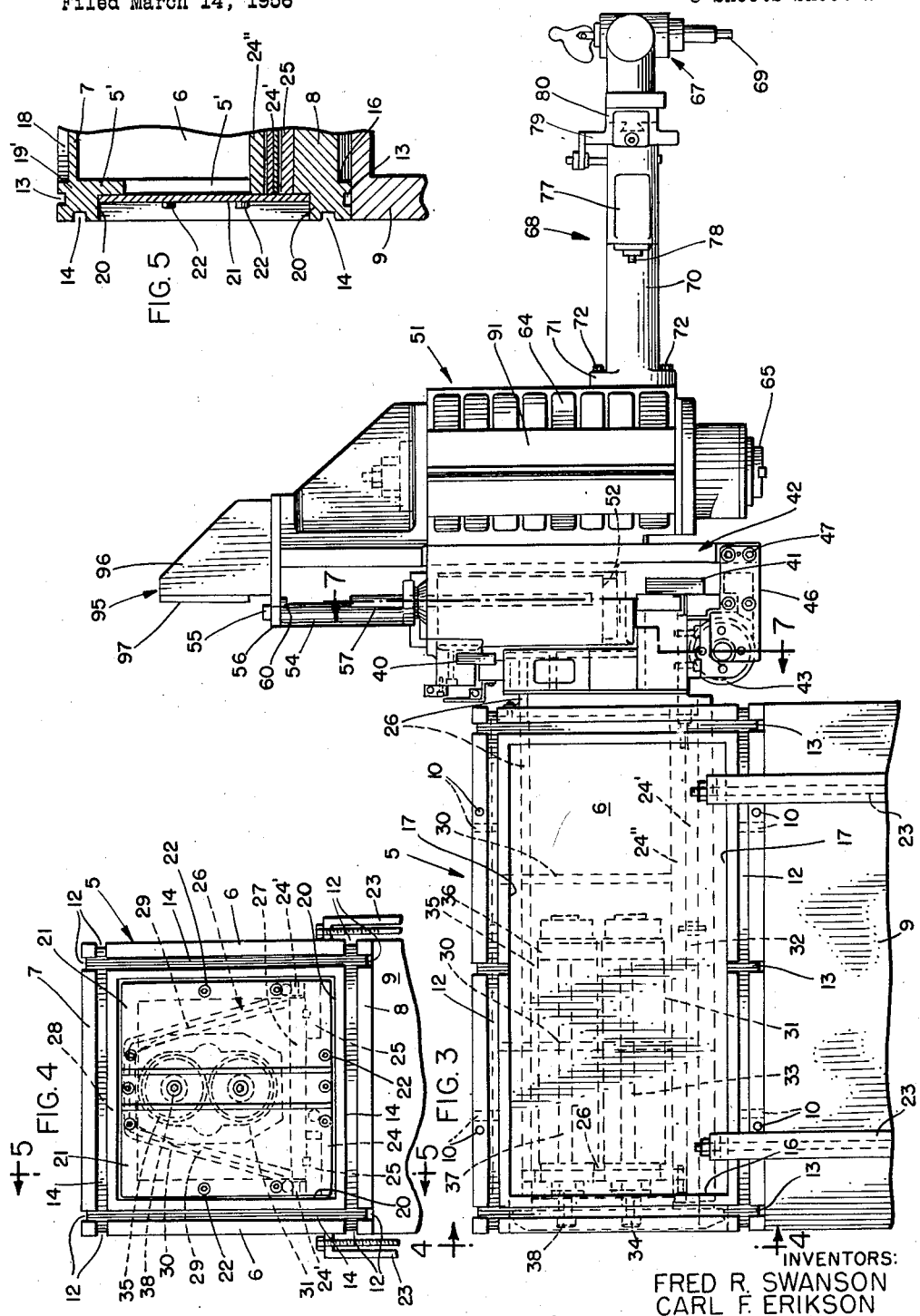

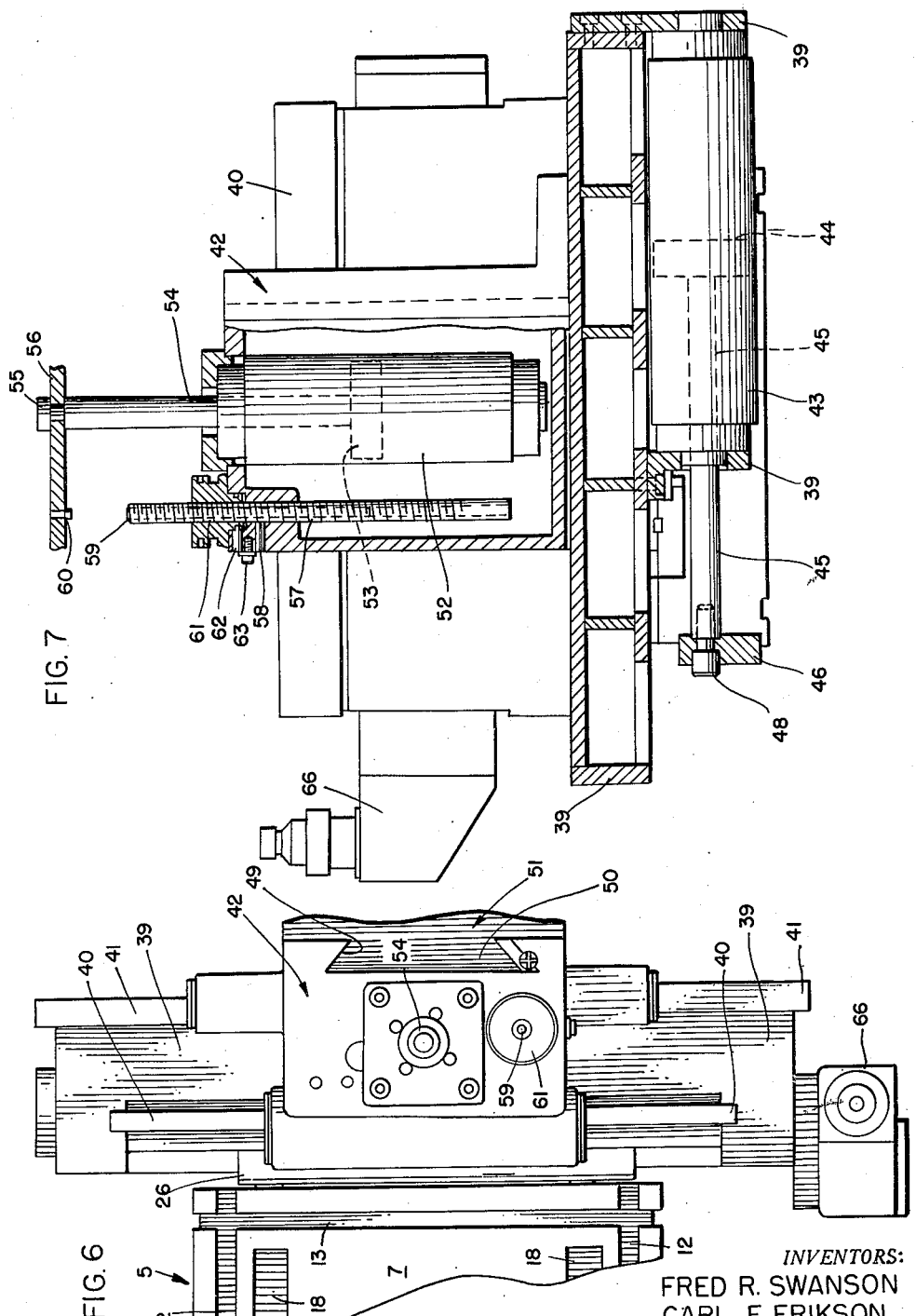

_United States Patent Office_

2,823,590
Patented Feb. 18, 1958

2,823,590

MACHINE TOOL

Fred R. Swanson and Carl F. Erikson, Rockford, Ill., assignors to Sundstrand Machine Tool Company, a corporation of Illinois Application March 14, 1956, Serial No. 571,522

20 Claims. (Cl. 90—13)

This invention relates to portable machine tools and more particularly to readily portable milling machines adapted to be easily moved from one place to another to be mounted adjacent relatively large work pieces which because of their size, mass, or awkward shape, are not themselves freely movable to a milling machine as is conventional with most work pieces.

It is a general object of the invention to provide a new and improved milling machine of the character described.

In the manufacturing industries, manufacturers are frequently confronted with the fabrication of excessively large, bulky, and oddly-shaped parts which require milling or other machining operations before the parts are completed. The machining of such parts gives rise to considerable difficulty because milling machines and other machine tools commonly are permanently anchored in stationary positions on suitable foundations, and the physical characteristics of the parts are such that they do not readily admit of movement to a machine tool, and when the parts can be moved, existing machines may not be capable of handling such parts. For example, the fabrication of airplane frame structures frequently requires machining operations and as is well known, such structures, particularly wing structures, may be many feet in width and of greater length. It will be appreciated that such parts are not easily handled for movement from place to place for successive operations thereon, and may require expensive machinery and a great amount of time to be properly positioned for work which may require only a short time.

With the above and other considerations in mind, it is a more specific object of the present invention to provide a new and improved, readily portable milling machine which is light in weight and compactly arranged so as to facilitate its movement to positions adjacent relatively large, stationary work pieces in machine shops or the like, and which is provided with means for easily attaching a handling device for moving the machine and with means for use in readily securing the machine to available supporting means adjacent the work.

Another object is to provide a portable milling machine including a hollow elongated base of rectangular cross section which is formed to support a ram therein for reciprocal movement longitudinally of the base, with one end of the ram projecting from one end of the base and having a saddle movably mounted thereon, with a cutter head movably mounted on the saddle and carrying a cutter spindle, the base being constructed with four exposed unobstructed outsides and one exposed, unobstructed outer end, any one of which sides or end may be placed in juxtaposition with available supporting means, with the base overlying, underlying, or in side-by-side relationship to the supporting means and with the base of the machine mounted right side up, on either side, upside down, or on end so that a milling cutter carried by the cutter spindle may be positioned to engage a relatively stationary workpiece.

A further object is to provide a new and improved tracer controlled milling machine of the character described which is readily portable for movement to positions adjacent stationary workpieces, which is adapted for use with a variety of such workpieces and which is extremely flexible for use with a variety of arrangements of the machine relative to the work and a variety of arrangements of a work pattern relative to the work and to the machine.

Another object is to provide a new and improved milling machine of the character described wherein the cutter head is provided with mounting surfaces facing in a plurality of directions about the axis of the cutter spindle to permit mounting of a tracer unit in a plurality of positions about the axis of the spindle to cooperate with work patterns which may be mounted either adjacent the relatively large workpiece or on the base of the machine.

Other objects and advantages will become readily apparent from the following detailed description taken in connection with the accompanying drawings, in which:

Fig. 1 is a plan view of a milling machine embodying the principles of this invention;

Fig. 2 is a vertical sectional view through the base of the machine illustrated in Fig. 1, taken at about the line 2—2 of Fig. 1;

Fig. 3 is a side elevational view of the milling machine illustrated in Fig. 1;

Fig. 4 is an end elevational view of the base of the machine illustrated in Figs. 1 and 3, taken from the left end as viewed in Figs. 1 and 3, at about the line 4—4 of Fig. 3;

Fig. 5 is a fragmentary, vertical sectional view taken at about the line 5—5 of Fig. 4;

Fig. 6 is an enlarged, fragmentary plan view of the machine shown in Fig. 1, with a mounting bracket illustrated in Fig. 1 removed from the cutter head to better illustrate details of the cutter head mounting and actuating means; and Fig. 7 is a fragmentary end elevational view of the machine illustrated in Figs. 1 and 2, but with the cutter head removed and with parts broken away to illustrate the actuating means for the cutter head and the actuating means for the saddle.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Referring now to the drawings, the invention is embodied in a milling machine including a hollow elongated base 5 of rectangular cross section, which as illustrated is square, as seen in Fig. 4. The base 5 is comprised of side walls 6, a top wall 7, and a bottom wall 8. When the machine is positioned as illustrated the walls 6, 7 and 8 may be referred to as side, top and bottom walls respectively, and for convenience of reference they are referred to as such hereinafter; however, inasmuch as the machine may be mounted in a number of different positions as described more fully hereinafter, each of the walls 6, 7 and 8 may be considered as a side wall.

The construction and arrangement of the machine is such that all the moving parts thereof are either inside the base 5 or project from one end of the base, the right end as viewed in Figs. 1 and 3, and the remaining exterior of the base is all exposed and free of obstructions, in a manner such that the machine may be mounted with either of the four side walls or one end wall of the base in juxtaposition with available supporting means, such as that illustrated at 9. That is to say, the bottom wall 8 of the base 5 may rest on the support 9, as illustrated, or the machine may be positioned with either of the side walls 6 resting on the support 9, or with the top wall 7 resting on the support 9, or with the left end of the base resting on the support, depending on which of these positions of the machine is necessary in order that the cutting tool carried thereby will be positioned so that the work will be accessible thereto.

The machine is particularly useful in the fabrication of air frame parts, such as airplane wing structures which frequently are relatively large parts, generally flat, and having irregular perimeters, such that a great amount of time and expensive machinery may be required in setting up such a part in a work fixture. Once such a part is fixed, it is desirable that as much work as possible be completed on the part without the necessity of repositioning the part, whether it be mounted in a generally horizontal position or in a generally vertical position. It is to this end that the construction of our machine is such that it may be mounted on any one of four sides or one end in order that the cutting tool may be moved to the work, rather than moving the work to the machine, as is most conventional. While the machine is particularly adapted for use in the industries referred to, and for detail work on the relatively large parts, it will be appreciated that it is by no means limited to such use.

In order to facilitate movement of the machine, it is compactly arranged, of relatively light-weight, hollow frame construction; and on the exterior of the base 5 each of the four side walls 6, 7 and 8 is provided with tapped holes 10, four to a side as illustrated, adapted to threadably receive means such as eye-bolts 11, illustrated in broken lines in Fig. 1, to facilitate connection of a handling device, such as an overhead crane for example, which may be utilized in moving the machine from one place to another in a machine shop or the like.

While the machine is illustrated with the base 5 on top of the support 9, it should be understood that the machine may be secured to available supporting means adjacent the work with the supporting means in underlying, overlying, or side-by-side relationship to the base. The support 9 may constitute a pad or pedestal provided on the work holding fixture or it may be provided otherwise, or other supporting means utilized.

In order to facilitate mounting of the machine, each of the walls 6, 7 and 8 is formed exteriorly with parallel, longitudinally extending grooves 12 and parallel, transversely extending grooves 13. The left end of the base 5, as viewed in Figs. 1 and 3, is formed in part by the left end face of each of the walls 6, 7 and 8, and the end face of each of the walls is formed with a groove 14 extending the length of the face, as seen in Fig. 4. The exposed grooves 12, 13 and 14 form a readily accessible means on each of the four exposed outside walls and on one end of the base 5 for receiving projecting guide means, such as that illustrated at 15, on the supporting means on which the machine is mounted. The cooperating guide means 12—15 serve to guide and confine movement of the base on the supporting means, primarily during positioning, and after the machine is positioned, serve with clamping means to hold the machine in place, as illustrated in Fig. 2.

To facilitate clamping the machine in position on the supporting means, each of the four side walls 6, 7 and 8 and the left end of the base is formed to provide clamping toes adjacent each edge of each wall adapted to be engaged by clamping means secured to the support. The outside of each of the side walls 6 and the bottom wall 8 is similarly formed so that the entire central portion of the wall is hollowed out to leave an outstanding perimeter around the edge of the wall in which the longitudinal and transverse guide grooves 12 and 13 are formed (Fig. 3). In this manner, at the left end of each wall, a transversely extending clamping toe 16 is formed (Figs. 3 and 5), and at opposite side edges of each wall, longitudinally extending clamping toes 17 are formed (Figs. 2 and 3).

The top wall 7 of the base 5 is differently formed on its exterior since, as described more fully hereinafter, it may be utilized to support a work pattern. Instead of having its entire central portion recessed, as do the walls 6 and 8, relatively narrow elongated recesses 18 (Figs. 1, 2 and 5) are provided adjacent the longitudinal edges of the wall so as to provide adjacent each longitudinal edge of the wall clamping toes 19 and adjacent the left end of the wall, clamping toes 19'.

The left end of the base 5 is formed in part by the left end face of each of the walls 6, 7 and 8 which define an outstanding perimeter at the end of the base in which the guide grooves 14 are formed (Fig. 4). As seen in Fig. 5, adjacent the left end of the base 5, it is formed with an internal flange 5' to which end plate means 21 is secured as by screws 22 to substantially close the end of the hollow base 5. The end plate 21, when secured in position, is recessed from the end face of walls 6, 7 and 8 so as to leave adjacent each edge of the end of the base a clamping toe 20 (Figs. 4 and 5).

Clamping means such as that illustrated at 23 (Figs. 2 and 3), forming a part of the support means if desired and including a part for clamping over the clamping toes on the base 5, may be utilized in securing the base 5 in position on the support.

Internally, the bottom wall 8 of the base 5 is formed with a longitudinally extending, hardened guideway means 24 (Figs. 2 and 4) adapted to receive and slidably support a longitudinally extending guide means 25 formed on the bottom of an elongated slide or ram 26 which is reciprocable in the base 5. Tapered gibs 24' overlie the guide means 25 at opposite sides of the ram, each acting between the guide means and a fixed rib 24" in the base. The ram 26 is also of hollow elongated construction and includes a bottom wall 27, a narrower top wall 28, and inclined side walls 29. Transversely extending braces 30 which are welded to the ribs 24" in interior of the base 5, are cut away at the central portion to receive the ram 26 and permit its reciprocation longitudinally of the base 5.

Reciprocal movement of the ram 26 back and forth within the base 5 is obtained by means of a piston and cylinder device including a cylinder 31 (Fig. 3) securely mounted in the ram structure 26 on an end plate 26' (Fig. 3), and housing a piston 32 having a rod 33 extending toward the left end of the base 5 and fixedly secured to a reinforced portion of end plate 21 by means such as screws indicated at 34. In this manner, the piston rod 33 is secured to the base 5 and the cylinder 31 is secured to the ram 26 so that on admission of fluid to opposite ends of the cylinder 31, reciprocal movement of the ram in the base 5 is obtained.

In order to counterbalance the weight of the ram 26 and parts carried thereby when the base 5 is mounted with its elongated axis vertically disposed, a second piston and cylinder device is connected between the ram and the base. It includes a cylinder 35 mounted in the ram on the end plate 26' and housing a piston 36 having a rod 37 connected to end plate 21 by means such as a screw 38. If the base 5 is mounted with the left end down, the right end of cylinder 35 may be placed in communication with a source of fluid under pressure to counterbalance the weight of the ram and parts carried thereby. If the base 5 is mounted with the left end up, fluid under pressure may be admitted to the left end of cylinder 35 for counterbalancing the weight of the ram and parts carried thereby.

At the right end of the base 5, as viewed in Figs. 1 and 2, the ram 26 projects exteriorly of the base, and the projecting end portion of the ram is provided with an elongated structure, generally designated 39, of hollow frame construction extending transversely of the length of the ram. The structure 39 is provided with hardened ways 40 and 41 which extend transversely of the length of the ram, and support a slide or saddle generally designated 42 for movement on the ram structure 39 transversely of the length of the ram along the ways 40 and 41.

Movement of the saddle 42 on the ram is obtained by means of a piston and cylinder device including a cylinder 43 (Fig. 7) which is securely mounted on the ram structure 39 with its axis extending transversely of the length of the ram. A piston 44 housed in the cylinder 43 has a piston rod 45 connected thereto and connected with the saddle through the medium of a connecting plate 46 secured to the saddle by means of screws indicated at 47 (Fig. 3) and to the piston rod 45 by means of a screw indicated at 48 (Fig. 7). On admission of fluid to opposite ends of the cylinder 43, the saddle will be reciprocated back and forth on the ways 40 and 41 in a horizontal direction transverse to the horizontal reciprocal movement of the ram 26. Thus, the saddle is mounted for two-dimensional movement.

The vertically extending face on the saddle 42 is formed with a recessed dovetailed guide 49 (Fig. 6) adapted to slidably receive a projecting dovetailed guide portion 50 formed on a cutter slide or head generally designated 51 to mount the cutter head for vertical movement back and forth in a direction transverse to the movement of the saddle 42 on the ram 26 and transverse to the movement of the ram 26 in the base 5. Vertical reciprocal movement of the cutter head 51 is obtained by means of a piston and cylinder device including a cylinder 52 secured on the saddle 42 and housing a piston 53 having a rod 54 connected therewith and connected by means of a screw 55 with a plate 56 extending from the cutter head 51. On admission of fluid to opposite ends of the cylinder 52, the piston 53 will be reciprocated to effect movement of the cutter head 51 in a direction transverse to the movement of the saddle 42 on the ram 26, and transverse to movement of the ram on the base 5. The cutter head is thus adapted for three-dimensional movement. Movement of the cutter head 51 in a downward direction may be limited by cooperating stop means provided on the saddle 42 and on the cutter head. The stop means includes an elongated stop screw 57 (Figs. 3 and 7) slidably mounted in the saddle 42 for adjustment vertically relative thereto, but held against rotation by means of a pin 58 which engages in a key slot extending the length of the screw 57. At its upper end the screw 57 includes an end portion 59 adapted to engage a stop member 60 provided on the plate 56 of the cutter head. An adjustment nut 61 is threaded on the stop screw 57 and rotatably mounted in the saddle 42 but held against axial movement by a pin 62 which engages in an annular groove formed on the nut. The pins 58 and 62 are retained in place by means of a screw 63 having an annular flange which engages the outer ends of the pins. The stop screw 57 is of particular use when it is desired to utilize the machine for two-dimensional work rather than three-dimensional work, as described more fully hereinafter.

As illustrated, the cutter head 51 is constructed to house a shaftless spindle drive motor 64 (Fig. 3) having its axis parallel to the direction of movement of the cutter head and which receives a rotary spindle 65 for supporting a milling cutter for machining workpieces. The shaftless spindle motor 64 may be of conventional design, and inasmuch as the details of its construction form no part of the present invention, they are not described herein. The motor may be connected in circuits not illustrated and including start and stop buttons on a control box 66 (Figs. 1, 6 and 7) conveniently mounted on the transversely elongated ram structure 39. The control box 66 has been omitted in Fig. 3 in order to more clearly show other features.

It will be appreciated that the machine as described is compactly arranged and of relatively light weight, hollow frame construction so as to be easily portable for movement to positions adjacent stationarily mounted work. The construction and arrangement of the saddle 42 to embrace the end of the ram 26 and having the cutter head 51 mounted on the face of saddle opposite that face of the saddle adjacent the ram places the ram, the saddle, and the cutter head in end-to-end, or side-by-side, relationship one after the other to ultimately position the axis of the spindle 65 so that it lies outside the structure of the base 5, the ram 26 and the saddle 42. The spindle is thus disposed at all times so that the machine may be moved to positions wherein the work will be accessible to a tool carried by the spindle.

If desired the cutter head 51 illustrated may be removed to permit its replacement by another head utilizing a different spindle drive more suitable for different conditions. To this end the piston rod 54 for moving the cutter head is readily disconnectible simply by removing the screw 55 which connects it to the head, whereupon the head may be simply removed by movement upwardly along the recessed dovetailed guide 49 by means such as, for example, an overhead crane conventionally found in machine shops or the like.

Movements of the ram, the saddle and the cutter head may be controlled by means of a tracer control unit 67 (Figs. 1 and 3) adapted to be mounted on the cutter head by means of an elongated arm structure 68, and including a spindle or stylus 69 movably mounted in the control unit and adapted to be manually guided over a work pattern, either two-dimensional or three-dimensional, to effect similar movement of the cutter head to produce a workpiece conforming to the work pattern. The tracer unit may be of conventional construction, and since it per se forms no part of the present invention it will not be described in detail. Suffice it to say that it may be connected in fluid circuits (not illustrated), also connected to the ram cylinder 31, the saddle cylinder 43, and the cutter head cylinder 52, and with a source of fluid under pressure so that movement of the tracer stylus 69 effects movement of the ram, the saddle and the cutter head in a manner now well known.

The elongated arm structure 68 for mounting the tracer unit includes a mounting arm 70 having at one end a flattened base 71 carrying a pair of bolts 72 threaded into clamping nuts carried in an elongated, vertically extending T-slot 73 formed in the cutter head 51. In this manner the arm 70 may be secured to the cutter head in adjusted vertical positions. The arm 70 is curved as seen in Fig. 1 and at the opposite end is formed with an angularly turned end portion 74 which terminates in a flat surface 75 having a recessed dovetailed guideway which, when the mounting arm is positioned as illustrated, extends in a horizontal direction parallel to the direction of ram movement, and receives a projecting dovetailed guide 76 formed on an adjustable bracket 77. The bracket 77 may be adjusted in a direction parallel to the direction of the ram movement by conventional means such as an adjustment screw 78 having a squared end portion adapted to receive a wrench or tool. In a similar manner, a second adjustable bracket 79 is mounted on the first adjustable bracket 77 for adjustment vertically in a direction parallel to movement of the cutter head on the saddle. Also in a similar manner, a third adjustable bracket 80 is mounted on the second bracket 79 for adjustment in a horizontal direction parallel to movement of the saddle on the ram. The tracer control unit 67 is secured to the third bracket 80 and is thereby mounted for three-dimensional adjustment in directions parallel to the three dimensional movement of the cutter head.

In view of the variety of positions in which the relatively large workpieces to be machined may be positioned, and in view of the variety of arrangements of the machine relative to the work, great difficulty may be encountered in positioning a work pattern so that it is accessible to the tracer unit. In order to facilitate mounting of the tracer unit such that it may always be positioned where the work pattern will be accessible, the cutter head 51 is provided with means for supporting the tracer unit in a plurality of positions. The supporting means includes a plurality of vertical surfaces, four as illustrated, spaced about the axis of spindle 65 90° apart, and each adapted to support the mounting arm 70 forming a part of the elongated arm structure supporting the tracer unit.

As best seen in Figs. 1 and 2, the exterior of the cutter head 51 is formed with flat vertically extending surfaces, three as illustrated, including a surface 90 on which the arm 70 is mounted for purposes of illustration in Figs. 1 and 3. Additionally surfaces 91 and 92 are provided, facing in opposite directions transverse to the longitudinal axis of the base 5. The surfaces 91 and 92 are formed with T-slots 93 and 94, respectively, similar to the slot 73 provided in the surface 90, extending longitudinally thereof to facilitate mounting of arm 70 in vertically adjusted positions. Additionally, the cutter head 51 supports on its top a bracket 95 including the plate 56, previously referred to, which forms the base of the bracket 95 and which is secured to the top of the cutter head by suitable means. The bracket 95 comprises a pair of parallel, vertically disposed web-like members 96 which extend upwardly from the top surface of the base plate 56 and are connected by a transversely extending member 97 having formed in its surface 97' facing the base 5 a T-slot 98 which is similar to the T-slots 73, 93 and 94 previously referred to except that it is of shorter length. The surfaces 97' and 90 face in opposite directions extending longitudinally of the longitudinal axis of the base 5.

The surfaces 90, 91 and 92 on the cutter head and the T-slots formed therein are utilized in mounting the arm 70 so that the tracer unit is positioned for cooperation with a work pattern which may be mounted adjacent the work piece. The bracket 96, with the member 97 and the T-slot 98 formed therein, facilitate mounting of the arm 70 so that the tracer unit extends over the base 5 for cooperation with a work pattern mounted on the base. The surfaces 90, 91 and 92 may be utilized to mount the tracer unit when space is available for mounting the work pattern adjacent the work piece and when the work piece is of a size which will permit the tracer unit to be positioned so that the work pattern will be accessible. In situations when no space is available for mounting the work pattern adjacent the work, or when the work pattern thus mounted would not be accessible to the tracer unit, the work pattern may be mounted on the base 5, and it is for this reason the top wall 7 of the base is formed differently than the walls 6 and 8, that is, to support a work pattern. Thus, the tracer unit may be mounted in any of the four different positions about the axis of the cutter spindle 65, and in either of the three positions on surfaces 90, 91 and 92 may be adjusted vertically along the length of the surface. The mounting arm 70 may be readily removed from the cutter head manually by movement upwardly or downwardly until the clamping nuts are moved out the end of the T-slots.

It should now be apparent that we have provided a new and improved portable milling machine which accomplishes the objects set forth at the beginning of the specification.

We claim:

1. A portable milling machine adapted for movement to positions adjacent supporting means and for attachment to such supporting means adjacent relatively large workpieces stationarily mounted, comprising, in combination, a hollow elongated base of rectangular cross section formed with four outsides and one end each providing an outer exposed and unobstructed mounting surface, to thereby permit mounting of the base with either of said four outsides or said one end in juxtaposition with supporting means, a ram mounted in the hollow base for reciprocal movement longitudinally of the base with one end of the ram projecting from the other end of the base, slide means on the projecting end of the ram carrying a rotary cutter spindle for bodily movement in directions transverse to each other and transverse to the movement of the ram, guide means formed on each of said four outsides and said one end adapted for cooperation with guide means on supporting means for confining and guiding slidable movement of the base relative to supporting means, means on each of said four outsides and said one end adapted for receiving clamping means for securing the base to the supporting means, means on each of said four outsides for receiving attachable means facilitating movement of the machine from place to place, and means connected between the base and the ram for counterbalancing the weight of the ram and parts carried thereby when the elongated axis of the base is vertically disposed.

2. A portable machine tool comprising, an elongated base, a first slide mounted on the base for reciprocal movement longitudinally of the base with one end of the first slide projecting from one end of the base, a second slide mounted on the first slide for movement in a direction transverse to the direction of movement of the first slide, a third slide mounted on the second slide for movement in a direction transverse to the directions of movement of the first and second slides, and rotary tool supporting means carried by the third slide, said base being formed at the other end and on at least one side with exterior mounting surfaces each adapted for engagement with supporting means to mount the base, so that the base may be mounted with said one side or with said other end in juxtaposition to supporting means.

3. A portable machine tool as defined in claim 2 including separate means for moving each of said slides, and means connected between the base and the first slide operable to counterbalance the weight of said first slide and parts carried thereby when the base is mounted with its elongated axis in an upright position.

4. A portable machine tool, comprising, a base, a first slide mounted on the base for reciprocal movement, a second slide mounted on the first slide for movement in a direction transverse to the direction of movement of the first slide, a third slide mounted on the second slide for movement in a direction transverse to the directions of movement of the first and second slides, and tool supporting means carried by the third slide, said base being formed with at least two separate exterior side surfaces each constructed for engagement separately with available supporting means for use alternatively in mounting the base.

5. A portable machine tool as defined in claim 4 wherein the exterior of the base is recessed within the area of each of said two side surfaces to interfit with projecting parts on the supporting means for confining and guiding movement of the base on the supporting means.

6. A portable machine tool as defined in claim 4 wherein the exterior of the base is recessed adjacent the area of each of said two side surfaces to form clamping toes on the base adapted for cooperation with clamping means for securing the base to the supporting means.

7. A portable machine tool comprising, a hollow elongated boxlike base of rectangular cross section, a first slide mounted in the hollow base for reciprocal movement longitudinally of the base with one end of the first slide projecting from one end of the base, the four exposed outsides and the other end of the base being unobstructed and each including a mounting surface separately engageable with available supporting means for use alternatively in mounting the base, and slide means mounted on the projecting end of the first slide including a tool support movable in two directions transverse to each other and transverse to the direction of movement of the first slide.

8. A machine tool comprising, a hollow elongated base, a first slide mounted in the hollow base for reciprocal movement longitudinally of the base with one end of the first slide projecting exteriorly of the base from one end and with the remaining exterior surfaces of the base unobstructed, a second slide mounted on the projecting end of the first slide for reciprocal movement in a direction transverse to the movement of the first slide, and a tool slide mounted on the second slide for reciprocal movement in a direction transverse to the directions of movement of the first and second slides and having thereon tool supporting means.

9. A portable milling machine adapted for movement to positions adjacent relatively large workpieces, comprising, in combination, a hollow elongated base of rectangular cross section formed with four outsides and one end each providing an exterior base mounting surface for use alternatively to mount the base, a ram mounted in the hollow base for reciprocal movement longitudinally of the base with one end of the ram projecting from the other end of the base, a saddle mounted on the projecting end of the ram for movement in a direction transverse to the direction of ram movement, a cutter head mounted for movement on the saddle in a direction transverse to the direction of ram movement and transverse to the direction of saddle movement, and a tool support on the cutter head rotatable about an axis parallel to the direction of movement of the cutter head, said cutter head being provided with exposed outer sides facing in different directions about the axis of the tool support, said outer sides each being formed to permit attachment of a support member for a tracer control unit so that the support member may be attached selectively in any one of a plurality of different positions angularly spaced about the axis of the tool support.

10. A milling machine, comprising, in combination, a base, a first slide mounted for reciprocal movement on the base, a second slide mounted for movement on the first slide in a direction transverse to the direction of movement of the first slide, a third slide mounted for movement on the second slide in a direction transverse to the direction of movement of the first and second slides, a rotary tool support on the third slide, an elongated arm structure for supporting a tracer unit, and means on the third slide positioned about the axis of the tool support for supporting the elongated arm structure selectively in any one of a plurality of different positions angularly spaced about the axis of the rotary tool support.

11. A portable milling machine adapted for movement to positions adjacent relatively large, stationary workpieces, comprising, in combination, an elongated base, a ram mounted for reciprocal movement longitudinally on the base with one end of the ram projecting beyond one end of the base, a saddle mounted on the projecting end of the ram for movement in a direction transverse to the direction of ram movement, a cutter head mounted on the saddle for movement in a direction transverse to the directions of ram movement and saddle movement, a rotary tool support on the cutter head, an elongated arm structure for supporting a tracer unit, and separate means on the cutter head disposed at angularly spaced positions about the axis of the tool support for supporting the elongated arm structure in any one of a plurality of different selective positions, in two of which positions the elongated arm structure extends respectively in opposite directions both transverse to the longitudinal axis of the elongated base, and in two other of which positions the elongated arm structure extends respectively in opposite directions both extending longitudinally of the longitudinal axis of the elongated base.

12. A portable milling machine adapted for movement to positions adjacent supporting means and for attachment to such supporting means adjacent relatively large workpieces stationarily mounted in a machine shop or the like, comprising, in combination, a hollow elongated base of rectangular cross section formed with four outsides and one end each providing an exterior mounting surface for use alternatively, to thereby permit mounting of the base with either of said four outsides or said one end in juxtaposition with the supporting means, a ram mounted in the hollow base for reciprocal movement longitudinally of the base with one end of the ram projecting from the other end of the base, a saddle mounted on the projecting end of the ram for movement in a direction transverse to the direction of ram movement, a cutter head mounted for movement on the saddle in a direction transverse to the direction of ram movement and transverse to the direction of saddle movement, a rotary tool support on the cutter head, an elongated arm structure supporting at one end thereof a tracer control unit for use in controlling the movements of the ram, the saddle and the cutter head, and means on the cutter head supporting the opposite end of the elongated arm structure in a position with the arm structure extending away from the base so that the tracer unit is positioned to cooperate with a work pattern mounted independently of the base, and separate means on the cutter head for use alternatively to support said opposite end of the arm structure in a position with the arm structure extending over the base for cooperation with a work pattern on the base.

13. A portable milling machine adapted for movement to positions adjacent relatively large, stationarily mounted workpieces, comprising, in combination, an elongated base, a ram mounted on the base for reciprocal movement longitudinally of the base with one end of the ram projecting beyond one end of the base, a saddle mounted on the projecting end of the ram so as to embrace the projecting end face of the ram for movement in a plane transverse to the direction of ram movement, a cutter head mounted on the side of the saddle opposite that side of the saddle which is adjacent the ram, the cutter head being mounted for movement in a plane transverse to the direction of ram movement and in a direction transverse to the direction of saddle movement, and a tool support on the cutter head rotatable about an axis parallel to the direction of movement of the cutter head, the arrangement being such that the ram, the saddle and the cutter head are all arranged one after the other so that the base may be supported on available supporting means with the axis of the tool support lying outside the structure of the supporting means, the base, the ram and the saddle in order that the work to be machined will be accessible to a tool carried by the tool support.

14. A portable milling machine adapted for movement to positions adjacent relatively large, stationarily mounted workpieces, comprising, in combination, an elongated base, a ram mounted on the base for reciprocal movement longitudinally of the base with one end of the ram projecting beyond one end of the base, a saddle mounted on the projecting end of the ram so as to embrace the projecting end face of the ram for movement in a plane transverse to the direction of ram movement, a cutter head mounted on the side of the saddle opposite that side of the saddle which is adjacent the ram, the cutter head being mounted for movement in a plane transverse to the direction of ram movement and in a direction transverse to the direction of saddle movement, a tool support on the cutter head rotatable about an axis parallel to the direction of movement of the cutter head, the arrangement being such that the ram, the saddle and the cutter head are all arranged one after the other, and an elongated arm structure having one end mounted on the cutter head, the arm structure extending away from the cutter head and having mounted thereon at its other end a tracer control unit adapted to cooperate with a work pattern for use in controlling the movements of the ram, the saddle and the cutter head.

15. A portable milling machine adapted for movement to positions adjacent relatively large, stationarily mounted workpieces, comprising, in combination, an elongated base, a ram mounted on the base for reciprocal movement longitudinally of the base with one end of the ram projecting beyond one end of the base, a saddle mounted on the projecting end of the ram so as to embrace the projecting end face of the ram for movement in a plane transverse to the direction of ram movement, a cutter head mounted on the side of the saddle opposite that side of the saddle which is adjacent the ram, the cutter head being mounted for movement in a plane transverse to the direction of ram movement and in a direction transverse to the direction of saddle movement, a tool support on the cutter head rotatable about an axis parallel to the direction of movement of the cutter head, the arrangement being such that the ram, the saddle and the cutter head are all arranged one after the other, means for moving the ram on the base, the saddle on the ram, and the cutter head on the saddle so as to effect three-dimensional movement of the cutter head, a tracer control unit for use in controlling the movements of the ram, the saddle and the cutter head, and means mounting the tracer unit on the cutter head for three-dimensional adjustment in directions parallel to the movements of the ram, the saddle and the cutter head.

16. A portable milling machine, comprising, a hollow elongated base having side walls, a bottom wall and a top wall, a hollow elongated ram in the hollow elongated base, cooperating guide means provided on the base and ram mounting the ram for reciprocal movement longitudinally in the base with one end of the ram projecting from one end of the base, one of said four walls of the base and the end of base opposite that end at which the ram projects each providing a base mounting surface so that the base may be mounted in a horizontal position or in a vertical position, an end plate closing said opposite end of the base, a first piston and cylinder device for actuating the ram including a cylinder inside the hollow ram secured thereto and housing a piston having a piston rod secured to said end plate, a second piston and cylinder device for counterbalancing the weight of the ram and parts carried thereby when the base is mounted in a vertical position including a cylinder inside the hollow ram secured thereto and housing a piston having a piston rod also secured to said end plate, and a cutter head movably mounted on the projecting end portion of the ram.

17. A portable machine tool, comprising, a base, a first slide mounted on the base for reciprocal movement, a second slide mounted on the first slide for movement in a direction transverse to the direction of movement of the first slide, a third slide mounted on the second slide for movement in a direction transverse to the direction of movement of the first and second slides, and tool supporting means carried by the third slide, said base being formed to provide at least two flat exterior base mounting surfaces for use alternatively in mounting the base, said mounting surfaces being disposed at right angles to each other and being parallel respectively with the directions of movement of two of said slides.

18. A portable machine tool, comprising, a hollow elongated boxlike base of rectangular cross section, a first slide mounted in the hollow base for reciprocal movement longitudinally of the base with one end of the first slide projecting from one end of the base, slide means mounted on the projecting end of the first slide including a tool support movable in two directions transverse to each other and transverse to the directions of movement of the first slide to thereby provide three-dimensional movement for the tool support, said base having at least two sides and an end each providing a flat exterior base mounting surface, said mounting surfaces being disposed in planes each transverse to the planes of the other two mounting surfaces and being parallel respectively with the directions of movement of the tool support.

19. A portable milling machine, comprising, a hollow elongated boxlike base of substantially square cross section, said base including a horizontally disposed bottom wall, a parallel top wall, two parallel vertically disposed side walls, and a vertically disposed end wall each providing a flat exterior base mounting surface, a ram mounted in the base for reciprocal movement horizontally, longitudinally of the base in a direction parallel to the bottom and top walls with one end of the ram projecting from the other end of the base, a saddle mounted on the projecting end of the ram for movement horizontally in a direction transverse to the direction of ram movement and parallel to said end wall, a cutter head mounted on the saddle for movement vertically in a direction transverse to the direction of ram movement, transverse to the direction of saddle movement and parallel to said side walls, and a tool support in the cutter head mounted for rotation about a vertically disposed axis parallel to the side and end walls.

20. A machine tool as defined in claim 19 including a tracer control unit for use in controlling movement of the cutter head, an elongated arm structure having at one end means supporting the tracer control unit, a vertically disposed surface on the cutter head parallel to said base end wall mounting the opposite end of the arm structure, and at least three additional vertically disposed arm structure mounting surfaces on the cutter head angularly spaced about the axis of the tool support from the first recited tracer mounting surface successively at 90° intervals for use alternatively in supporting the arm structure.

References Cited in the file of this patent
UNITED STATES PATENTS 2,759,507    Davis et al.             Aug. 21, 1956